(12) United States Patent
Chen et al.

(10) Patent No.: US 9,323,406 B2
(45) Date of Patent: Apr. 26, 2016

(54) ELECTRONIC PAPER TOUCH DEVICE

(71) Applicant: Rich IP Technology Inc., Taipei (TW)

(72) Inventors: Han-Chang Chen, Taipei (TW); Yen-Hung Tu, Taipei (TW); Chung-Lin Chia, Taipei (TW); Jen-Chieh Chang, Taipei (TW); Chih-Wen Wu, Taipei (TW)

(73) Assignee: Rich IP Technology Inc., Taipei (TW)

( * ) Notice: Subject to any disclaimer, the term of this patent is extended or adjusted under 35 U.S.C. 154(b) by 3 days.

(21) Appl. No.: 14/056,513

(22) Filed: Oct. 17, 2013

(65) Prior Publication Data

US 2015/0009170 A1 Jan. 8, 2015

(30) Foreign Application Priority Data

Jul. 2, 2013 (TW) .............................. 102123576 A

(51) Int. Cl.
*G06F 3/044* (2006.01)

(52) U.S. Cl.
CPC ..................................... *G06F 3/044* (2013.01)

(58) Field of Classification Search
None
See application file for complete search history.

(56) References Cited

U.S. PATENT DOCUMENTS

| 2011/0109568 A1* | 5/2011 | Wu et al. ........................ 345/173 |
| 2011/0234513 A1* | 9/2011 | Pan et al. ....................... 345/173 |
| 2012/0044190 A1* | 2/2012 | Yilmaz ........................... 345/174 |
| 2015/0002450 A1* | 1/2015 | Lewis ...................... G06F 3/044 345/174 |

* cited by examiner

*Primary Examiner* — Nicholas Lee
*Assistant Examiner* — Duane N Taylor, Jr.
(74) *Attorney, Agent, or Firm* — Ming Chow; Sinorica, LLC

(57) ABSTRACT

An electronic paper touch device including: a first substrate; a first electrode layer located on the first substrate; an electronic paper display layer located on the first electrode layer; a transparent electrode layer located on the electronic paper display layer and having plural transparent electrodes; a second substrate located on the transparent electrode layer; and a control unit having a touch mode and an electronic paper mode, wherein, when the control unit is in the touch mode, the control unit will couple a touch detection unit with the first electrode layer and with the transparent electrode layer to perform a capacitive touch detection procedure.

8 Claims, 10 Drawing Sheets

ELECTRONIC PAPER TOUCH DEVICE

The current application claims a foreign priority to the patent application of Taiwan No. 102123576 filed on Jul. 2, 2013.

BACKGROUND OF THE INVENTION

1. Field of the Invention

The present invention relates to a touch device, especially to an electronic paper touch device, which is capable of utilizing an electronic paper structure to perform a capacitive touch detection procedure.

2. Description of the Related Art

Please refer to FIG. 1a-1c, which illustrate the operation principle of a prior art electronic paper display. In FIG. 1a, a positive voltage $+V_{Eink}$ is applied to top ends of all electronic paper display cells to make all of the electronic paper display cells display a white color. In FIG. 1b, a negative voltage $-V_{Eink}$ is applied to the top end of a specific electronic paper display cell to attract black particles and expel white particles to make the specific electronic paper display cell display a black color. In FIG. 1c, the specific electronic paper display cell still displays the black color after the negative voltage $-V_{Eink}$ is removed. To make the specific electronic paper display cell change to display the white color, the positive voltage $+V_{Eink}$ has to be applied to the top end of the specific electronic paper display cell to attract the white particles and expel the black particles. In driving the electronic paper display cell to make it change display colors, a sufficiently large voltage (that is, $V_{Eink}$ must be larger than a threshold) and a sufficiently long driving time are necessary. If the applied voltage is not large enough or the driving time is not long enough, the electronic paper display cell will not change display colors, that is, the electronic paper display cell has a bi-stable characteristic.

By taking advantage of the bi-stable characteristic of the electronic paper display cell, the present invention proposes an electronic paper touch device.

SUMMARY OF THE INVENTION

One objective of the present invention is to disclose an electronic paper touch device, which can make use of an electrode architecture of an electronic paper and a bi-stable characteristic of the electronic paper to provide both a display function and a touch function.

Another objective of the present invention is to disclose an electronic paper touch device, which can make use of two electrodes of an electronic paper to perform a self-capacitor touch detection procedure or a mutual-capacitor touch detection procedure.

Another objective of the present invention is to disclose an electronic paper touch device, which can make use of an electrode layer of an electronic paper to perform a mutual-capacitor touch detection procedure.

Another objective of the present invention is to disclose an electronic paper touch device, which can use a voltage biasing technique to enhance the reliability of touch detection.

Still another objective of the present invention is to disclose an electronic paper touch device, which can provide dual touch planes.

To attain the foregoing objectives, an electronic paper touch device is proposed, including:
 a first substrate;
 a first electrode layer located on the first substrate;
 an electronic paper display layer located on the first electrode;
 a transparent electrode layer located on the electronic paper display layer and having plural transparent electrodes;
 a second substrate located on the transparent electrode; and
 a control unit having a touch mode and an electronic paper mode, wherein, when the control unit is in the touch mode, the control unit will couple a touch detection unit with the first electrode layer and with the transparent electrode layer to perform a capacitive touch detection procedure; when the control unit is in the electronic paper mode, the control unit will couple one end of an electronic paper voltage source with the first electrode layer and another end of the electronic paper voltage source with the transparent electrode layer to perform an image write-in procedure.

In one embodiment, the electronic paper display layer includes plural display structures, and the display structure is selected from a group consisting of a micro capsule, a micro cup, a rotatable ball, and any combination thereof.

In one embodiment, the touch detection unit has a touch voltage source, of which the voltage is not larger than the voltage of the electronic paper voltage source.

In one embodiment, the capacitive touch detection procedure is selected from a group consisting of a self-capacitor touch detection procedure, a mutual-capacitor touch detection procedure, and any combination thereof.

In one embodiment, the capacitive touch detection procedure includes a reverse voltage biasing step.

In one embodiment, the capacitive touch detection procedure has an active time not longer than that of the electronic paper mode.

In one embodiment, the touch detection unit provides a mirror voltage to reduce an effective capacitance of the electronic paper touch device to enhance the reliability of touch detection.

In one embodiment, the touch detection unit makes the first electrode layer floating to reduce an effective capacitance of the electronic paper touch device, so as to enhance the reliability of touch detection.

In one embodiment, the touch detection unit makes the transparent electrode layer floating to reduce an effective capacitance of the electronic paper touch device, so as to enhance the reliability of touch detection.

In one embodiment, the first substrate is implemented by a transparent material selected from a group consisting of glass, polycarbonate, Polymethylmethacrylate, and Polyethylene Terephthalate.

In one embodiment, the second substrate is implemented by a transparent material selected from a group consisting of glass, polycarbonate, Polymethylmethacrylate, and Polyethylene Terephthalate.

In one embodiment, the first electrode layer is a whole-plane electrode layer, and the transparent electrode layer has plural separate electrodes.

In one embodiment, the first electrode layer has plural first separate electrodes, and the transparent electrode layer has plural second separate electrodes.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 3a-3b illustrate two operation timing diagrams of a control unit of FIG. 2a.

DETAILED DESCRIPTION OF THE PREFERRED EMBODIMENTS

The present invention will be described in more detail hereinafter with reference to the accompanying drawings that show the preferred embodiments of the invention.

Figure 1A:
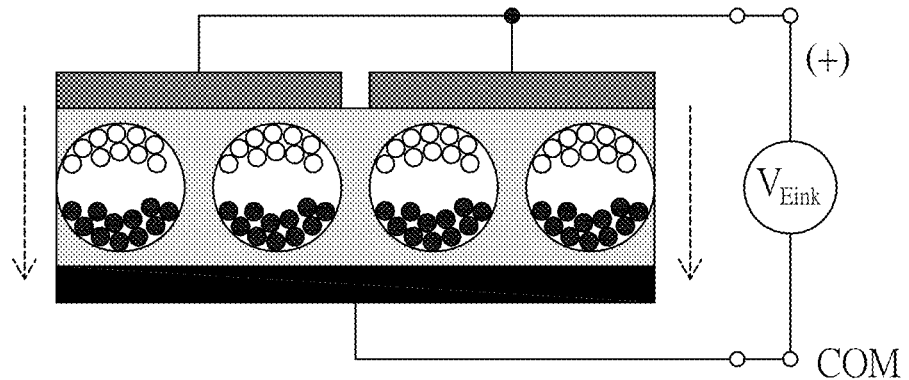
FIG. 1a-1c illustrate the operation principle of a prior art electronic paper display.
Figure 1B:
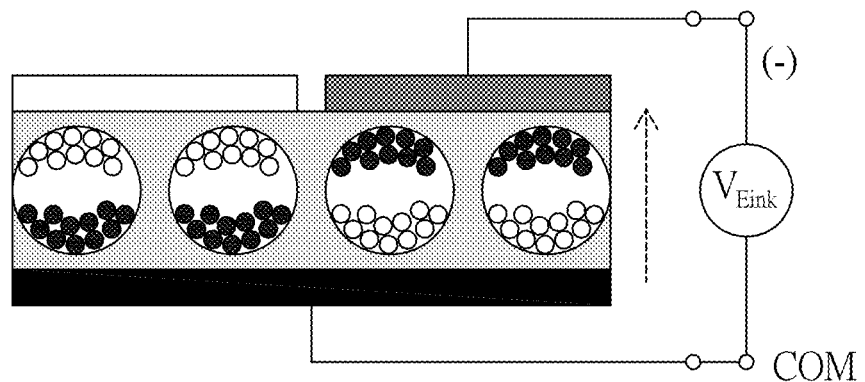
Figure 1C:
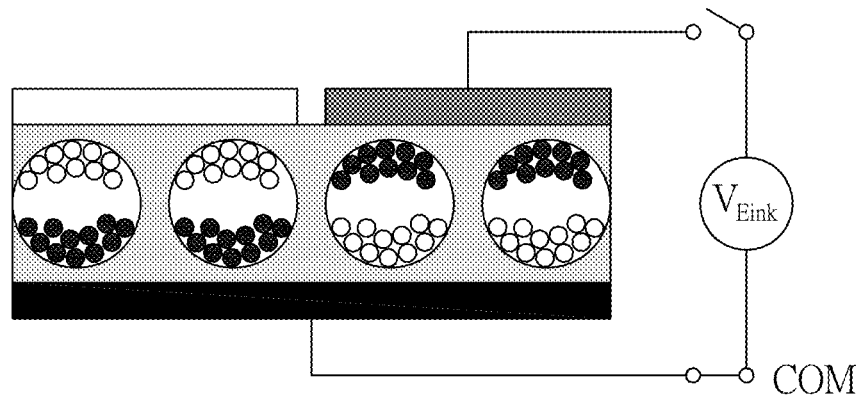
Figure 2A:
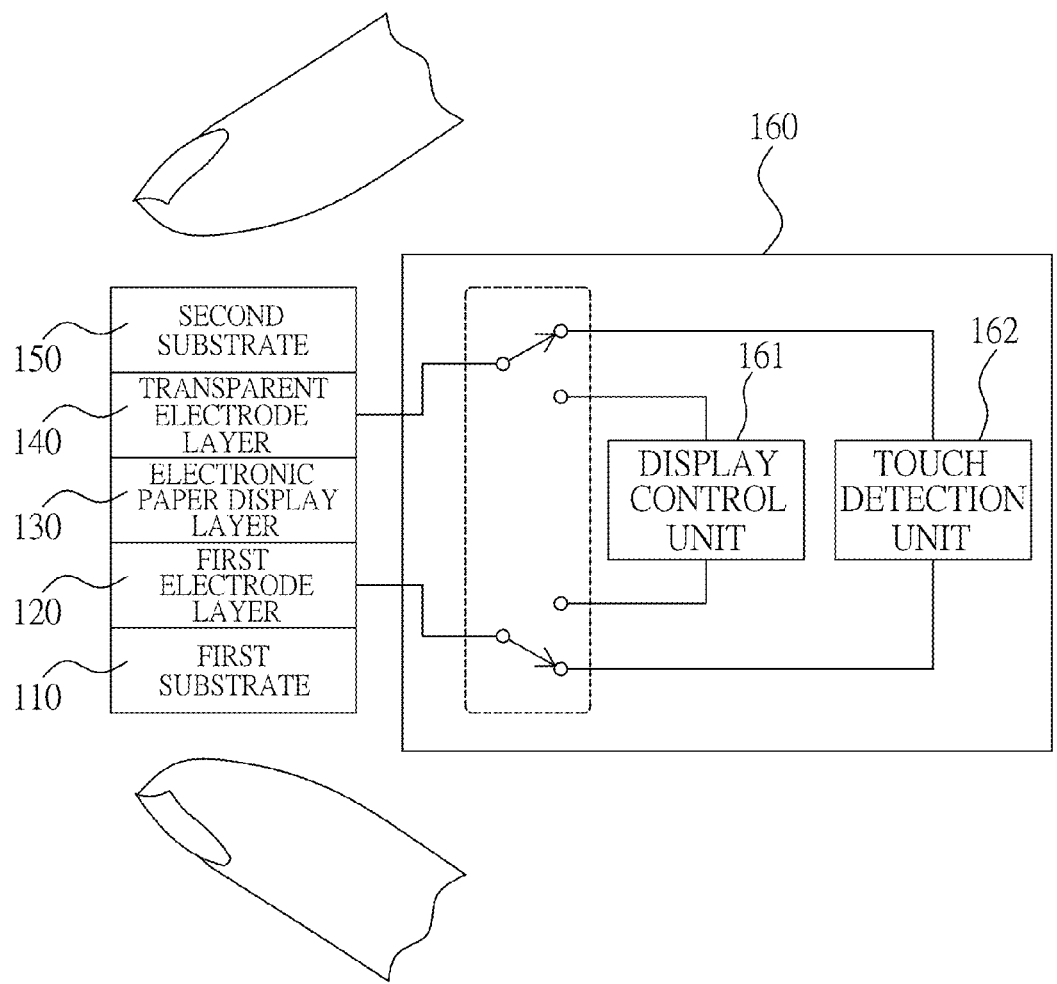
FIG. 2a illustrates a preferred embodiment of an electronic paper touch device of the present invention.

Please refer to FIG. 2a, which illustrates a preferred embodiment of an electronic paper touch device of the present invention. As illustrated in FIG. 2a, the electronic paper touch device includes a first substrate 110, a first electrode layer 120, an electronic paper display layer 130, a transparent electrode layer 140, a second substrate 150, and a control unit 160.

The first substrate 110 is implemented by a transparent material selected from a group consisting of glass, polycarbonate, Polymethylmethacrylate, and Polyethylene Terephthalate, to provide a first touch plane.

The first electrode layer 120, located on the first substrate 110, can be a whole-plane electrode or made of plural first separate electrodes, wherein the first separate electrode can have a shape of long rectangle, square, triangle, or circle, etc.

The electronic paper display layer 130, located on the first electrode layer 120, includes plural display structures, and the display structure can be a micro capsule, a micro cup, or a rotatable ball. As the micro capsule, micro cup, and rotatable ball are all known structures, they will not be addressed further.

The transparent electrode layer 140, implemented by, for example but not limited to ITO (Indium Tin Oxide), is located on the electronic paper display layer 130 and has plural transparent electrodes. The transparent electrode can have a shape of long rectangle, aquare, triangle, or circle, etc.

The second substrate 150, located on the transparent electrode layer 140, is implemented by a transparent material selected from a group consisting of glass, polycarbonate, Polymethylmethacrylate, and Polyethylene Terephthalate, to provide a second touch plane.

Figure 2B:
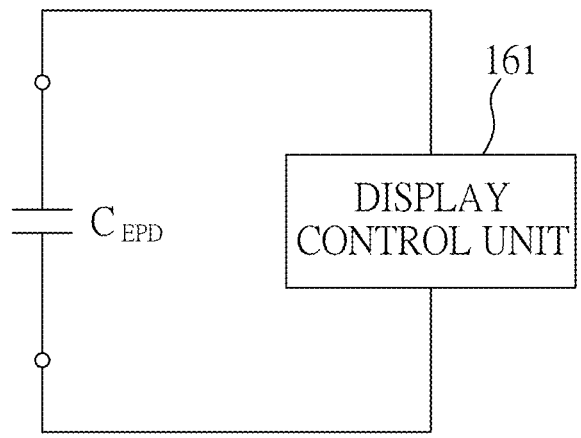
FIG. 2b illustrates an image write-in mode of the present invention.
Figure 2C:
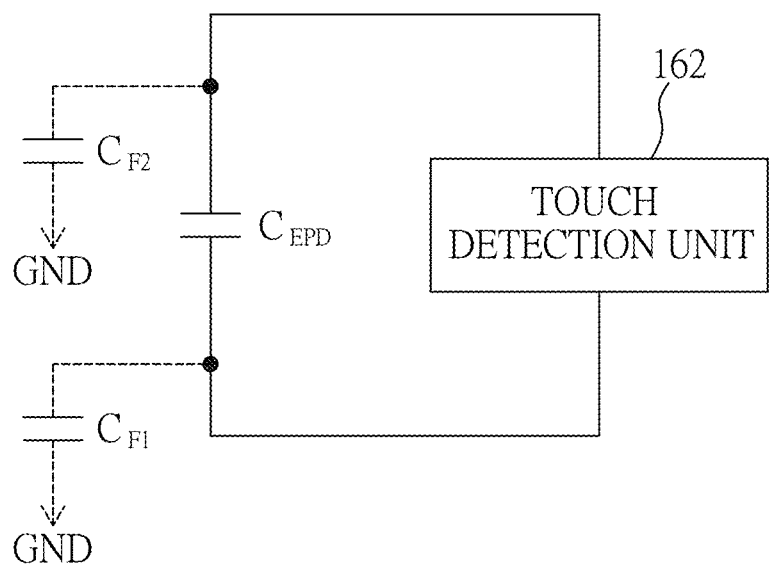
FIG. 2c illustrates a touch detection mode of the present invention.

The control unit 160 has a display control unit 161 to perform an image write-in mode (please refer to FIG. 2(b), in which $C_{EPD}$ is a capacitor defined by the first electrode layer 120 and the transparent electrode layer 140), and a touch detection unit 162 to perform a touch detection mode (please refer to FIG. 2(c), in which $C_{EPD}$ is a capacitor defined by the first electrode layer 120 and the transparent electrode layer 140, $C_{F1}$ is a capacitor induced by a finger approaching the first electrode layer 120, and $C_{F2}$ is a capacitor induced by a finger approaching the transparent electrode layer 140), wherein, when the control unit 160 is in the touch mode, the control unit 160 will couple the touch detection unit 162 with the first electrode layer 120 and/or with the transparent electrode layer 140 to perform a capacitive touch detection procedure; when the control unit 160 is in the electronic paper mode, the control unit 160 will make the display control unit 161 provide an electronic paper voltage source, and couple one end of the electronic paper voltage source with the first electrode layer 120, and another end of the electronic paper voltage source with the transparent electrode layer 140, to perform an image write-in procedure.

Figure 3A:
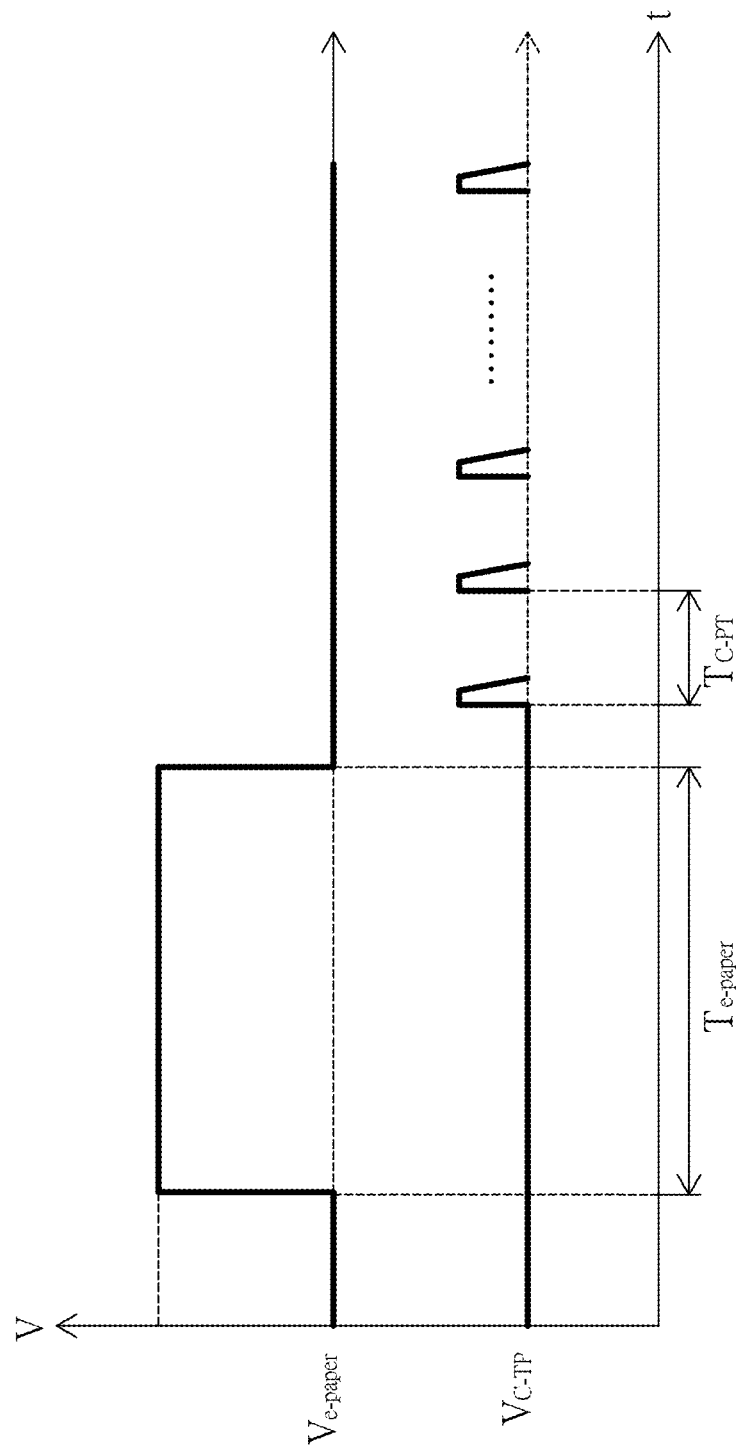
Figure 3B:
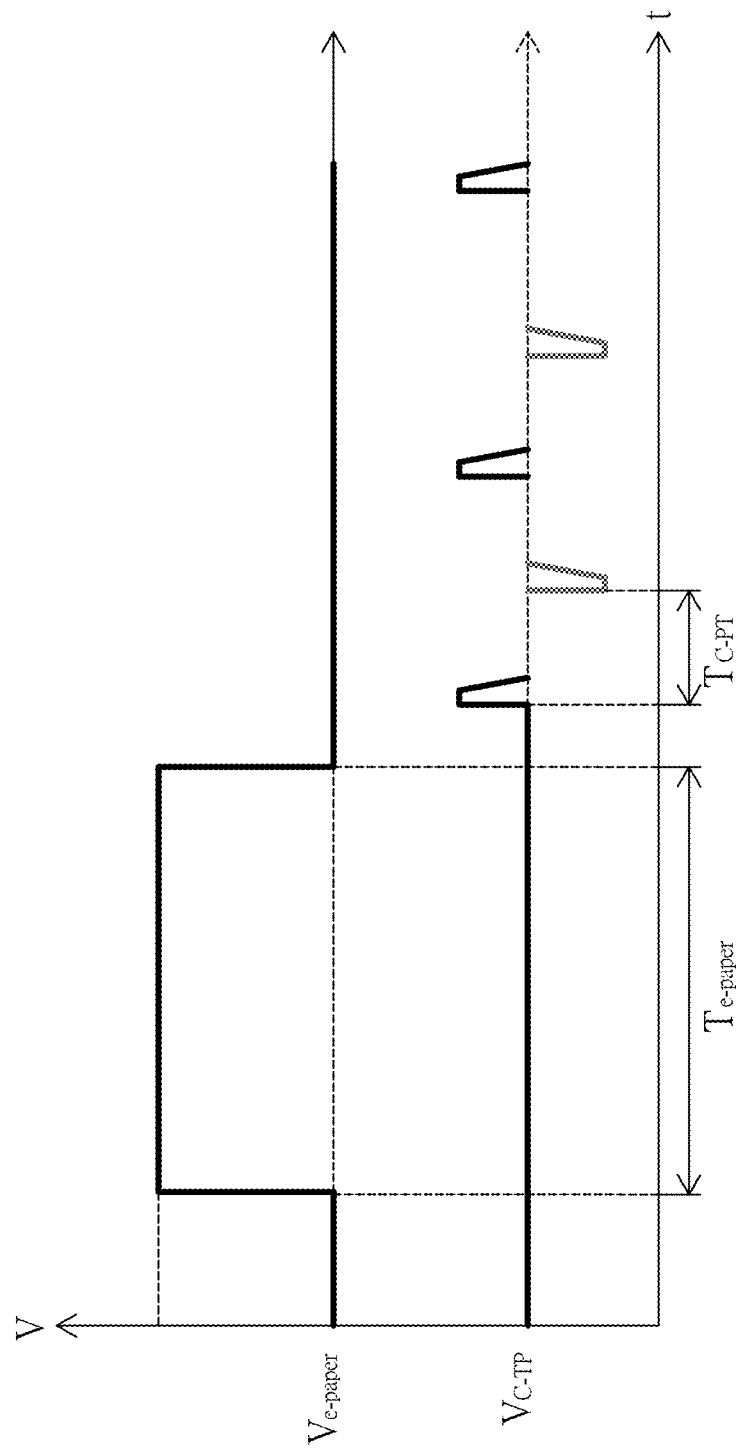

In performing the capacitive touch detection procedure, the touch detection unit 162 provides a touch voltage source having a voltage not larger than the voltage of the electronic paper voltage source, and sets an active time of the capacitive touch detection procedure not longer than the active time of the image write-in mode, to avoid changing the display status of the electronic paper display layer 130. Besides, the capacitive touch detection procedure can also include a reverse voltage biasing step to further ensure the display status of the electronic paper display layer 130 stays unchanged. Please refer to FIG. 3a-3b, which illustrate two operation timing diagrams of the control unit 160. As illustrated in FIG. 3a-3b, the voltage of the electronic paper voltage source ($V_{e-paper}$) is larger than the voltage of the touch voltage source ($V_{C-TP}$), a second active time ($T_{C-PT}$, approximately 10-20 ms) of the capacitive touch detection procedure is not longer than a first active time ($T_{e-paper}$, approximately 100-200 ms) of the electronic paper mode, and the touch voltage source ($V_{C-TP}$) in FIG. 3b has negative voltage pulses interleaved with positive voltage pulses to further ensure the display status of the electronic paper display layer 130 stays unchanged.

In addition, the capacitive touch detection procedure is selected from a group consisting of a self-capacitor touch detection procedure, a mutual-capacitor touch detection procedure, and any combination thereof.

The self-capacitor touch detection procedure includes a charging step, a charge redistribution step, and a comparison step. In the charging step, a touch voltage source is used to charge a sensing capacitor. In the charge redistribution step, a charge-transfer capacitor is connected in parallel with the sensing capacitor. In the comparison step, the voltage on the charge-transfer capacitor is compared with a reference voltage. When a touch event takes place, the voltage on the charge-transfer capacitor will have a different rising speed, and a touch event can be determined accordingly. As the charging step, the charge redistribution step, and the comparison step are already well known, they will not be addressed further.

The mutual-capacitor touch detection procedure includes a signal transmitting step, and a signal receiving step. In the signal transmitting step, a voltage signal is sent to one end of a sensing capacitor. In the signal receiving step, a sensing signal is received from another end of the sensing capacitor. When in operation, the voltage of the sensing signal will change in response to a touch event, and the touch event can therefore be determined accordingly. As the mutual-capacitor touch detection is already well known, it will not be addressed further.

Figure 4A:
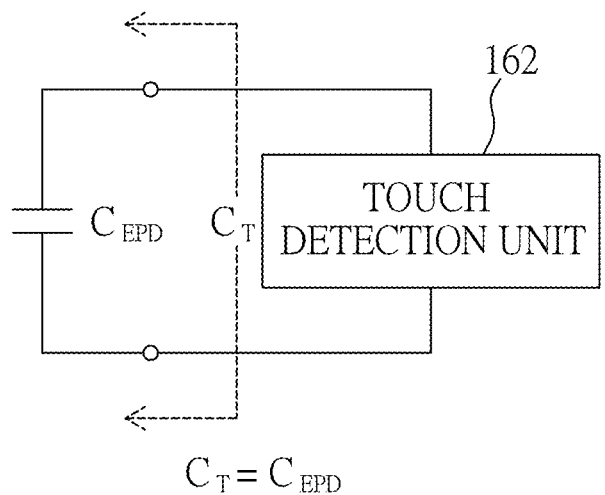
FIG. 4a-4b illustrate an embodiment of the control unit of FIG. 2a performing a self-capacitor touch detection procedure.
Figure 4B:
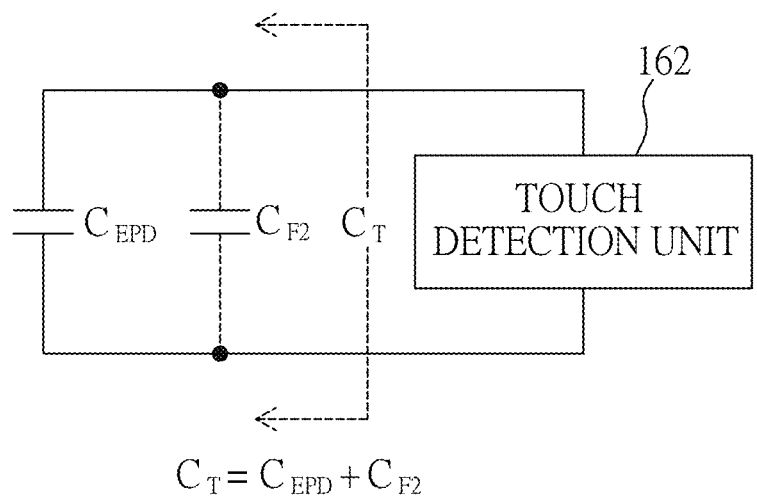

Please refer to FIG. 4a-4b, which illustrate an embodiment of the control unit 160 performing the self-capacitor touch detection procedure. In FIG. 4a, one end of the touch detection unit 162 is coupled with the first electrode layer 120, and another end of the touch detection unit 162 is coupled with the transparent electrode layer 140, and the touch detection unit 162 sees an effective capacitor $C_T=C_{EPD}$ when there is no touch event. In FIG. 4b, the touch detection unit 162 sees an effective capacitor $C_T=C_{EPD}+C_{F2}$ when there is a touch event.

Figure 4C:
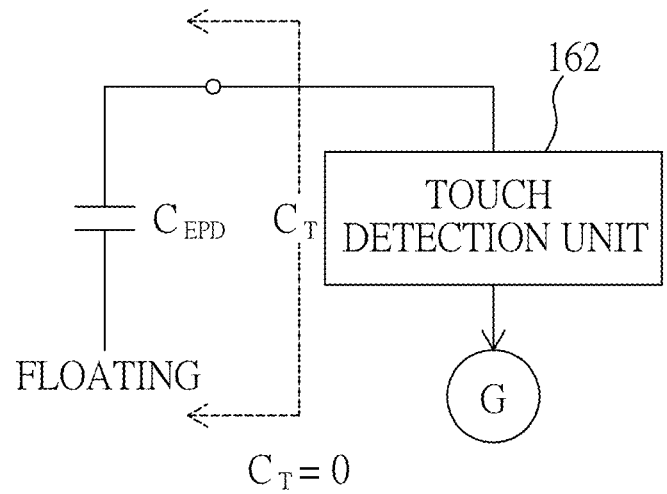
FIG. 4c-4d illustrate another embodiment of the control unit of FIG. 2a performing the self-capacitor touch detection procedure.
Figure 4D:
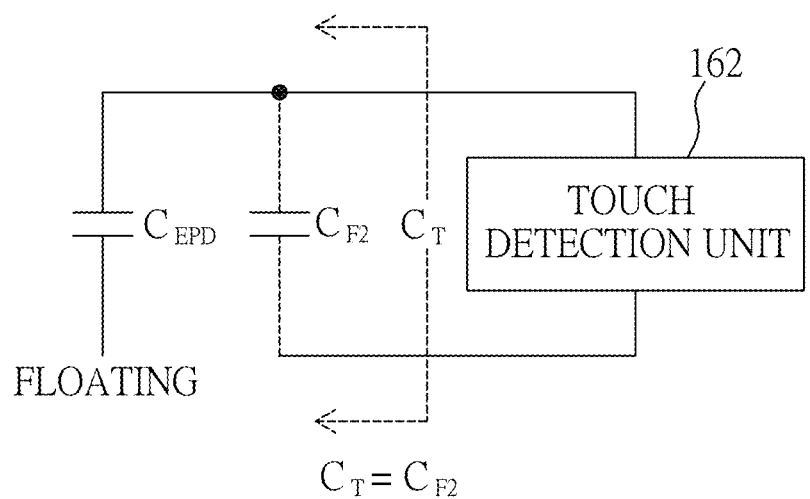

Please refer to FIG. 4c-4d, which illustrate another embodiment of the control unit 160 performing the self-capacitor touch detection procedure. In FIG. 4c, one end of the touch detection unit 162 is coupled with the transparent electrode layer 140, and another end of the touch detection unit 162 is isolated from the first electrode layer 120, and the touch detection unit 162 sees an effective capacitor $C_T=0$ when there is no touch event. In FIG. 4d, the touch detection unit 162 sees an effective capacitor $C_T=C_{F2}$ when there is a touch event.

Figure 4E:
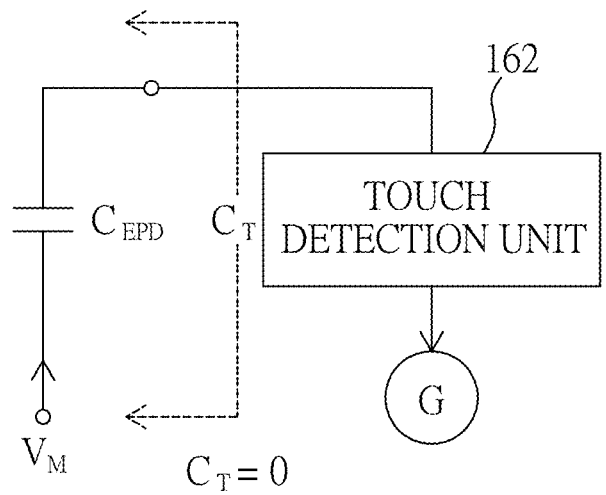
FIG. 4e-4f illustrate still another embodiment of the control unit of FIG. 2a performing the self-capacitor touch detection procedure.
Figure 4F:
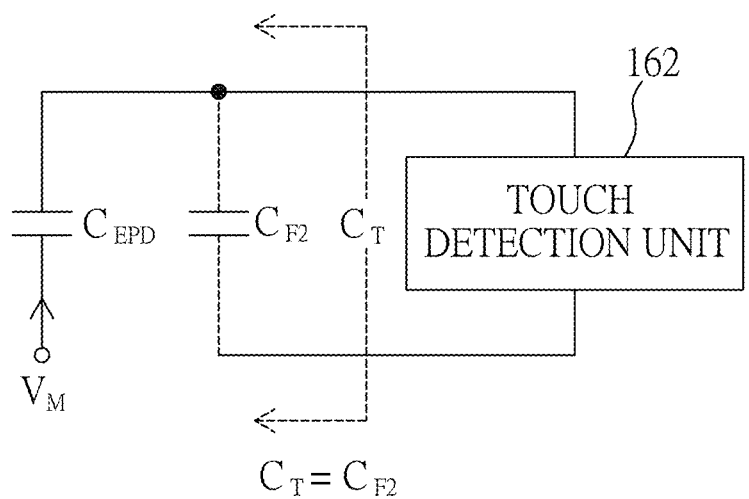

Please refer to FIG. 4e-4f, which illustrate still another embodiment of the control unit 160 performing the self-capacitor touch detection procedure. In FIG. 4e, the transparent electrode layer 140 is coupled with one end of the touch detection unit 162, and the first electrode layer 120 is coupled with a mirror voltage $V_M$, which is generated according to the voltage at the transparent electrode layer 140, and can be used to reduce the effective capacitance of the electronic paper touch device, thereby enhancing the reliability of touch detection, and the touch detection unit 162 sees an effective capacitor $C_T=0$ when there is no touch event. In FIG. 4f, the touch detection unit 162 sees an effective capacitor $C_T=C_{F2}$ when there is a touch event.

Figure 5A:
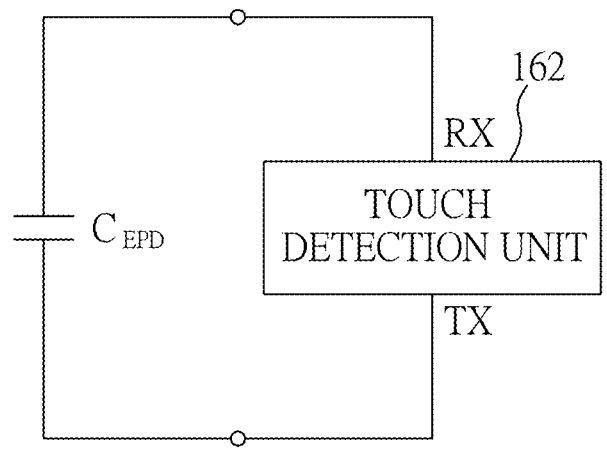
FIG. 5a-5b illustrate an embodiment of the control unit of FIG. 2a performing a mutual-capacitor touch detection procedure.
Figure 5B:
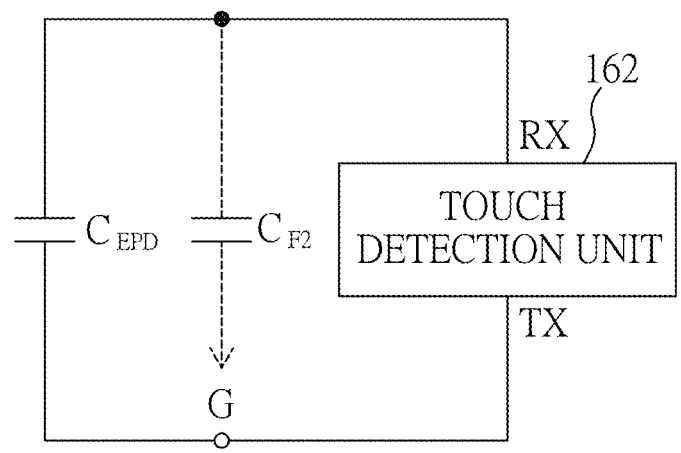

Please refer to FIG. 5a-5b, which illustrate an embodiment of the control unit 160 performing the mutual-capacitor touch detection procedure. In FIG. 5a, a signal transmitting end TX of the touch detection unit 162 is coupled with the first electrode layer 120, a signal receiving end RX of the touch detection unit 162 is coupled with the transparent electrode layer 140, and the signal receiving end RX receives a first signal from $C_{EPD}$ when there is no touch event. In FIG. 5b, the signal receiving end RX receives a second signal from a voltage dividing circuit consisting of $C_{EPD}$ and $C_{F2}$ when there is a touch event on the transparent electrode layer 140, and the second signal has a smaller amplitude than the first signal.

Figure 5C:
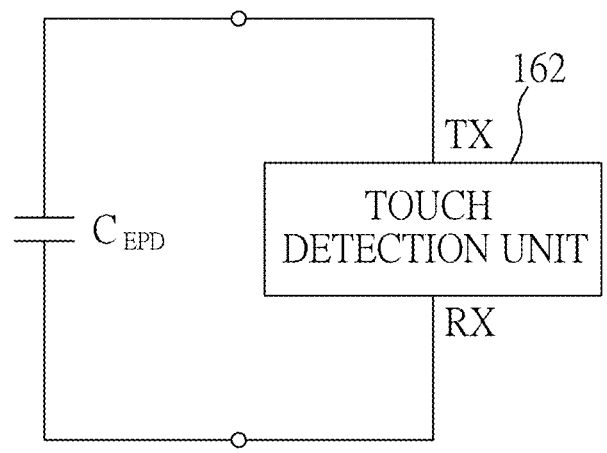
FIG. 5c-5d illustrate another embodiment of the control unit of FIG. 2a performing the mutual-capacitor touch detection procedure.
Figure 5D:
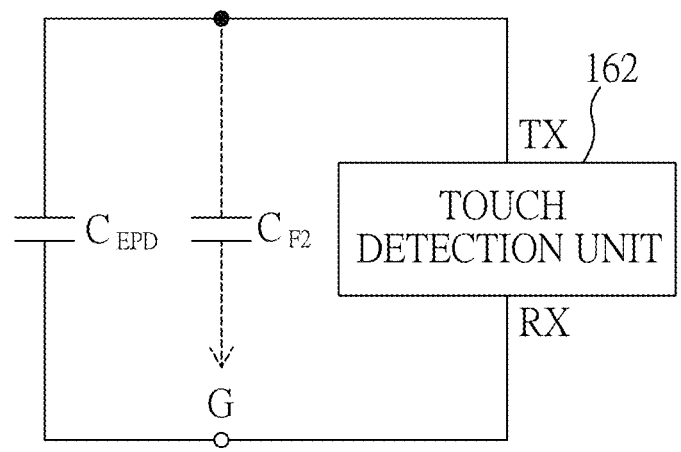

Please refer to FIG. 5c-5d, which illustrate another embodiment of the control unit 160 performing the mutual-capacitor touch detection procedure. In FIG. 5c, a signal transmitting end TX of the touch detection unit 162 is coupled with the transparent electrode layer 140, a signal receiving end RX of the touch detection unit 162 is coupled with the first electrode layer 120, and the signal receiving end RX receives a first signal from $C_{EPD}$ when there is no touch event. In FIG. 5d, the signal receiving end RX receives from $C_{EPD}$ a second signal, which is attenuated by $C_{F2}$ when there is a touch event on the transparent electrode layer 140, and the second signal has a smaller amplitude than the first signal.

Thanks to the novel designs mentioned above, the present invention possesses the following advantages:

1. The electronic paper touch device of the present invention is capable of utilizing the electrode architecture and bi-stable characteristic of an electronic paper to provide both a display function and a touch function.

2. The electronic paper touch device of the present invention is capable of utilizing two electrode layers of an electronic paper to perform a self-capacitor touch detection procedure or a mutual-capacitor touch detection procedure.

3. The electronic paper touch device of the present invention is capable of utilizing an electrode layer of an electronic paper to perform a self-capacitor touch detection procedure or a mutual-capacitor touch detection procedure.

4. The electronic paper touch device of the present invention is capable of utilizing a voltage biasing technique to enhance the reliability of touch detection.

5. The electronic paper touch device of the present invention is capable of providing dual touch planes.

As the electronic paper touch device of the present invention is capable of utilizing an electronic paper structure to perform a capacitive touch detection procedure, and capable of utilizing the bi-stable display characteristic of the electronic paper to provide static touch icons to facilitate a user to perform a touch operation, the present invention therefore has made a breakthrough in touch technology.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. An electronic paper touch device, comprising:
   a first substrate;
   a first electrode layer located on said first substrate;
   an electronic paper display layer located on said first electrode layer;
   a transparent electrode layer located on said electronic paper display layer and having plural transparent electrodes, and said electronic paper display layer includes plural display structures, and said display structure is selected from a group consisting of a micro capsule, a micro cup, and a rotatable ball;
   a second substrate located on said transparent electrode layer;
   a control unit having a touch detection unit and an electronic paper voltage source, wherein, when said control unit is in a touch mode, said control unit will disconnect said electronic paper voltage source from said first electrode layer and said transparent electrode layer, and couple said touch detection unit with said first electrode layer and with said transparent electrode layer to perform a capacitive touch detection procedure; and when said control unit is in an electronic paper mode, said control unit will disconnect said touch detection unit from said first electrode layer and said transparent electrode layer, and couple said electronic paper voltage source with said first electrode layer and with said transparent electrode layer to perform an image write-in procedure; and said electronic paper mode has a first active time, said capacitive touch detection procedure has a second active time, and said first active time is longer than said second active time; and
   said capacitive touch detection procedure is a self-capacitor touch detection procedure operable on said first electrode layer or said transparent electrode layer so that the electronic paper touch device supports a touch plane on said first substrate and a touch plane on said second substrate, which provide dual touch planes; or said capacitive touch detection procedure is a mutual-capacitor touch detection procedure sending scanning signals to said first electrode layer and receiving sensed signals from said transparent electrode layer or sending scanning signals to said transparent electrode layer and receiving sensed signals from said first electrode layer so that the electronic paper touch device supports a touch plane on said first substrate and a touch plane on said second substrate, which provide dual touch planes, said touch detection unit includes a touch voltage source having a smaller voltage than said electronic paper voltage source, and said touch detection unit provides a mirror voltage to reduce an effective capacitance of said electronic paper touch device.

2. The electronic paper touch device as claim 1, wherein said capacitive touch detection procedure is selected from a group consisting of a self-capacitor touch detection procedure, a mutual-capacitor touch detection procedure, and any combination thereof.

3. The electronic paper touch device as claim 1, wherein said capacitive touch detection procedure includes a reverse voltage biasing step.

4. The electronic paper touch device as claim 1, wherein said touch detection unit makes an electrode layer, which is selected from a group consisting of said first electrode layer and said transparent electrode layer, floating to reduce an effective capacitance of said electronic paper touch device.

5. The electronic paper touch device as claim 1, wherein said first substrate is implemented by a transparent material selected from a group consisting of glass, polycarbonate, Polymethylmethacrylate, and Polyethylene Terephthalate.

6. The electronic paper touch device as claim 1, wherein said second substrate is implemented by a transparent material selected from a group consisting of glass, polycarbonate, Polymethylmethacrylate, and Polyethylene Terephthalate.

7. The electronic paper touch device as claim 1, wherein said first electrode layer is a whole-plane electrode layer, and said transparent electrode layer has plural separate electrodes.

8. The electronic paper touch device as claim 1, wherein said first electrode layer has plural first separate electrodes, and said transparent electrode layer has plural second separate electrodes.

* * * * *